United States Patent
Kennedy et al.

(10) Patent No.: US 9,479,631 B2
(45) Date of Patent: Oct. 25, 2016

(54) MODE CHANGE FOR NEAR FIELD COMMUNICATION READER

(75) Inventors: Benedict Kennedy, Bordon (GB); James Morley-Smith, High Wycombe (GB)

(73) Assignee: SYMBOL TECHNOLOGIES, LLC, Holtsville, NY (US)

( * ) Notice: Subject to any disclaimer, the term of this patent is extended or adjusted under 35 U.S.C. 154(b) by 698 days.

(21) Appl. No.: 13/204,962

(22) Filed: Aug. 8, 2011

(65) Prior Publication Data
US 2013/0040560 A1 Feb. 14, 2013

(51) Int. Cl.
  H04B 5/00 (2006.01)
  H04M 1/725 (2006.01)
  H04W 52/02 (2009.01)
  H04B 7/00 (2006.01)

(52) U.S. Cl.
  CPC ....... H04M 1/7253 (2013.01); H04W 52/0261 (2013.01); H04M 2250/12 (2013.01)

(58) Field of Classification Search
  CPC ............. H04B 5/0056; H04B 5/0062; H04W 52/0261; H04W 52/0251; H04W 4/008; H04M 1/7253; H04M 2250/12
  USPC ................... 455/41.1, 41.2, 41.3; 340/13.26
  See application file for complete search history.

(56) References Cited

U.S. PATENT DOCUMENTS

| | | | |
|---|---|---|---|
| 2005/0083181 A1* | 4/2005 | Jalkanen et al. | 340/10.34 |
| 2005/0164633 A1* | 7/2005 | Linjama et al. | 455/41.2 |
| 2005/0282588 A1 | 12/2005 | Linjama et al. | |
| 2006/0079180 A1* | 4/2006 | Sinivaara | H04B 5/00 455/41.2 |
| 2006/0229113 A1* | 10/2006 | Rowse | 455/574 |
| 2006/0290472 A1* | 12/2006 | Onderko et al. | 340/10.1 |
| 2007/0008140 A1* | 1/2007 | Saarisalo et al. | 340/572.7 |
| 2008/0039212 A1* | 2/2008 | Ahlgren et al. | 463/46 |
| 2008/0090537 A1* | 4/2008 | Sutardja | G06F 1/3203 455/232.1 |
| 2009/0145957 A1* | 6/2009 | Zancola | G06K 7/10316 235/375 |
| 2009/0280826 A1 | 11/2009 | Malik et al. | |
| 2009/0312000 A1* | 12/2009 | Wakefield et al. | 455/418 |
| 2010/0070829 A1 | 3/2010 | Vishne et al. | |
| 2011/0081923 A1 | 4/2011 | Forutanpour et al. | |
| 2011/0083111 A1 | 4/2011 | Forutanpour et al. | |
| 2012/0052879 A1* | 3/2012 | Wildon et al. | 455/456.1 |
| 2013/0012270 A1* | 1/2013 | Naftolin | 455/566 |

OTHER PUBLICATIONS

PCT International Search Report and Written Opinion mail date Nov. 12, 2012 for Application No. PCT/US2012/048823.
International Preliminary Report on Patentability mailed Feb. 11, 2014 in counterpart PCT application PCT/US2012/048823.

* cited by examiner

Primary Examiner — Ayodeji Ayotunde

(57) ABSTRACT

A mobile system includes a Near-Field Communication (NFC) reader, a sensor, a memory arrangement, and a processor. The NFC reader is configured to communicate with an electronic device within a predetermined range. The sensor obtaining data related to a state of the mobile system and external conditions of the mobile system. The memory arrangement storing a mode application configured to determine when a mode of the NFC reader is to be changed as a function of the data. The processor executing the mode application and changing the mode when at least one of the state and the external conditions changes beyond a respective predetermined threshold.

14 Claims, 2 Drawing Sheets

MODE CHANGE FOR NEAR FIELD COMMUNICATION READER

BACKGROUND

An electronic device may be configured with a near field communication (NFC) functionality. The NFC functionality may relate to a variety of short range communication technologies such as a range of 40 millimeters. A NFC reader may enable a first device to communicate with a second device so that data may be exchanged between the first and second devices via the NFC functionality. For example, when a purchase is made, credit card data may be exchanged between a cellular phone and a cash register. Conventional devices with the NFC functionality may recognize predetermined criteria such as interface gestures to initiate a file sharing functionality via the NFC reader.

Conventional electronic devices incorporating the NFC functionality often maintain the NFC reader in an activated state to allow a user to utilize the NFC functionality at any time. However, the exchange of data related to the NFC functionality generally takes a very short time such as half a second. Therefore, an electronic device may require continuous power to leave the NFC reader activated, thereby draining power the entire time. For example, if the electronic device leaves the NFC reader activated for an 8-hour day and an average of 40 NFC tags are read, the NFC reader is only used for about 20 seconds in the 8-hour period. Thus, a vast majority of the power (99.93%) used to maintain the NFC reader in the activated state is being wasted.

SUMMARY OF THE INVENTION

The present invention relates to a mobile system including a Near-Field Communication (NFC) reader, a sensor, a memory arrangement, and a processor. The NFC reader is configured to communicate with an electronic device within a predetermined range. The sensor obtaining data related to a state of the mobile system and external conditions of the mobile system. The memory arrangement storing a mode application configured to determine when a mode of the NFC reader is to be changed as a function of the data. The processor executing the mode application and changing the mode when at least one of the state and the external conditions changes beyond a respective predetermined threshold.

DETAILED DESCRIPTION

Figure 1:
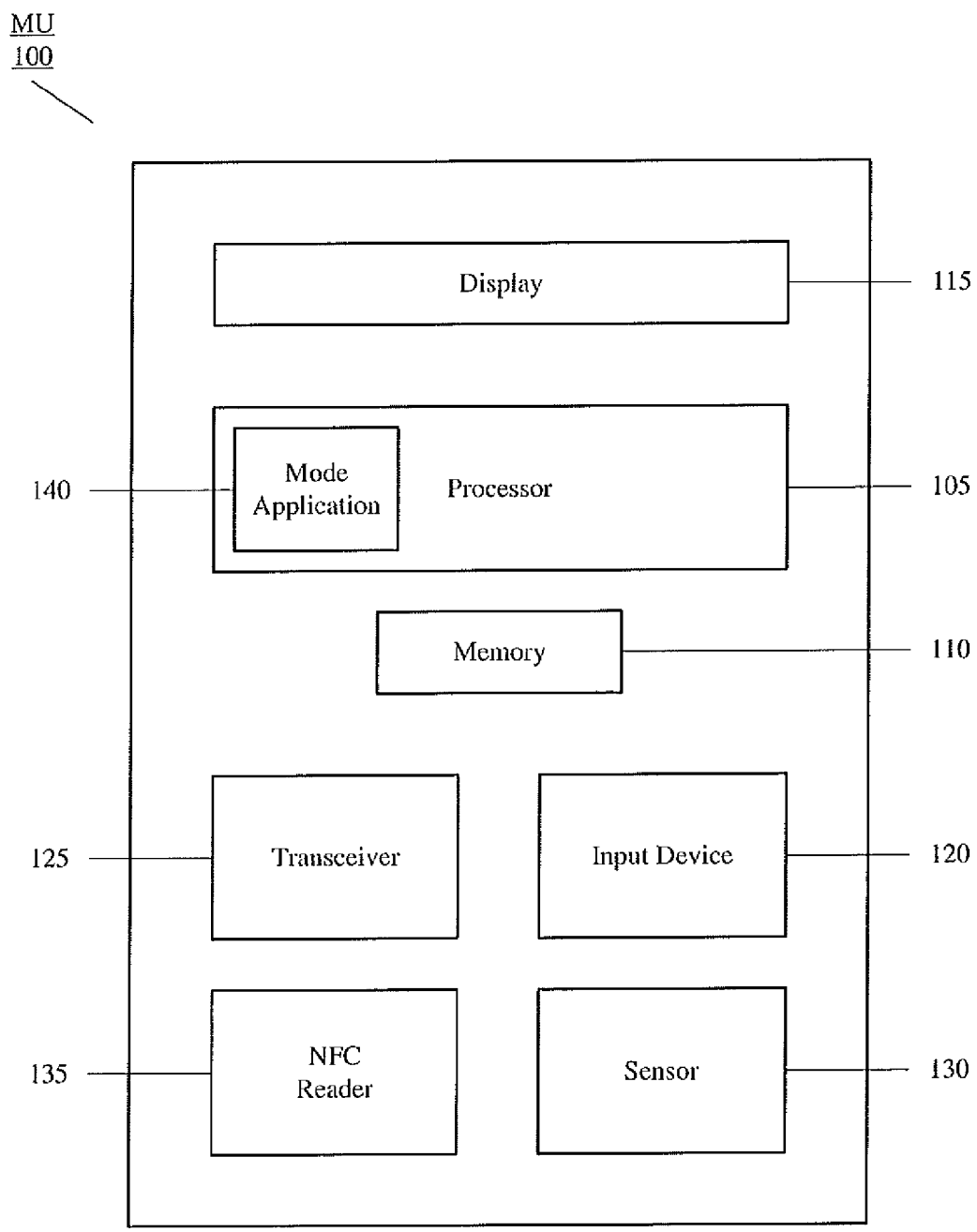
FIG. 1 shows a mobile unit with a near field communication functionality according to an exemplary embodiment of the present invention.

The exemplary embodiments may be further understood with reference to the following description and the appended drawings, wherein like elements are referred to with the same reference numerals. The exemplary embodiments of the present invention describe a mobile unit (MU) including a NFC functionality that is configured to change a mode of the MU as a function of external parameters. Specifically, a NFC reader of the MU may be activated, deactivated, changed, etc. depending on a variety of factors of an environment in which the MU is disposed. Accordingly, a power supply of the MU may conserve energy by not wasting energy by leaving the NFC reader continuously activated. The MU, the NFC functionality, the NFC reader, the external parameters, the mode, and a related method will be discussed in further detail below.

FIG. 1 shows a MU 100 with a NFC functionality according to an exemplary embodiment of the present invention. The MU 100 may be any portable electronic device that has a portable power supply. For example, the MU 100 may be a mobile phone, a PDA, a smartphone, a tablet, a laptop, a scanner, a barcode reader, etc. However, it should be noted that the MU 100 may be any electronic device including mobile ones and stationary ones and the exemplary embodiments may enable conserving power for either types of devices. The MU 100 may be configured to communicate with another electronic device or NFC tag so that data may be exchanged therebetween via the NFC functionality. The MU 100 may include a processor 105, a memory arrangement 110, a display 115, an input device 120, a transceiver 125. a sensor 130, and a NFC reader 135. It should be noted that the device 100 may include a variety of other conventional components such as the aforementioned power supply, ports to connect to other devices, etc.

The processor 105 may provide conventional functionalities for the MU 100. For example, the MU 100 may include a plurality of applications that are executed on the processor 105 such as an application including a web browser when connected to a network via the transceiver 130. The processor 105 of the MU 100 may also execute a mode application 140 to determine a mode for the NFC reader 135 as will be described in further detail below. The memory 110 may also provide conventional functionalities for the MU 100. For example, the memory 110 may store data related to operations performed by the processor 105. As will be described in further detail below, the memory 110 may also store the mode application 140 including parameters related to data collected by the sensor 130 and predetermined values of the parameters that indicate a change in the mode.

The display 115 may be any conventional display that is configured to display data to the user. For example, the display 115 may be an LCD display, an LED display, a touch screen display, etc. The input device 120 may be any conventional input component such as a keypad, a mouse, a push-to-talk button, etc. If the display 115 is a touch screen display, allowing the user to enter information through the display 115, then the input device 120 may be optional. The transceiver 125 may also be any conventional component configured to transmit and/or receive data. The transceiver 125 may therefore enable communication with other electronic devices directly or indirectly through a network.

The sensor 130 may receive data from the MU 100 and external conditions in which the MU 100 is disposed. That is, a state of the MU 100 may be determined by the sensor 130 such as a speed, a position, an orientation, a shakiness, etc. The external conditions may also be determined by the sensor 130 such as ambient lighting around the MU 100. The sensor 130 be configured with a plurality of components to receive a variety of different data. As will be described in further detail below, the sensor may provide data which is used by the mode application 140 to determine the mode of the NFC reader 135. The NFC reader 135 may be a conventional component performing the NFC functionality in which data is exchanged (e.g., transmitted and/or received) with another electronic device configured with the NFC functionality.

In a first example, the sensor 130 may include a sonar sensor that emits and/or receives sounds. The sonar sensor may provide proximity data to the mode application 140. In a first exemplary embodiment, the sonar sensor may emit a sound in a direction that the NFC reader 135 is configured to read. The sound may bounce back and be received by the sonar sensor and a time associated therewith may allow the mode application 140 to determine a distance to an object. In a second exemplary embodiment, the sonar sensor may emit a radial sound and when the sound is received again, a time associated therewith and in conjunction with a vector of the sound may indicate a distance of objects around the MU 100.

In a second example, the sensor 130 may include a laser distance reader. The laser distance reader may operate in a substantially similar fashion as the sonar sensor. Thus, a laser or light may be emitted in a direction that the NFC reader 135 is configured to read and when the light bounces back and is received by the laser distance reader, a time associated therewith may allow the mode application 140 to determine a distance to the object.

In a third example, the sensor 130 may include a positioning component such as a magnetometer, a Global Positioning System (GPS) reader, a gyroscopic sensor, etc. The magnetometer may determine an orientation of the MU 100, in particular, the NFC reader 135. The GPS reader may determine a position of the MU 100. The gyroscopic sensor may also provide orientation data or predictions of orientations as a function of movement of the MU 100. Thus, in an exemplary embodiment, the GPS reader may indicate that the MU 100 may be disposed in a particular environment (e.g., inside a warehouse) while the magnetometer and/or the gyroscopic sensor may indicate that the MU 100 is oriented to receive NFC data.

In a fourth example, the sensor 130 may be associated with a wired or wireless network connection. As discussed above, the transceiver 125 may be configured to connect to and communicate with a network. The network may be configured with positioning components such as those discussed above. From data received from the MU 100, the network may determine various positioning data related to the MU 100, thereby the sensor 130 and the mode application 140 also having access to the positioning data.

In a fifth example, the sensor 130 may include an accelerometer. The accelerometer may provide data related to changes in position of the MU 100. Thus, the accelerometer may provide conventional data such as increases and decreases in velocity of the MU 100. For example, the accelerometer may indicate that the MU 100 maintains a continuous speed which may be interpreted by the mode application 140 that the NFC reader 135 will probably not be used. In another example, the accelerometer may indicate that the MU 100 has slowed to a stop and combined with other data received by the sensor 130, the mode application 140 may interpret the data that the NFC reader 135 will be used.

In a sixth example, the sensor 130 may include a light sensor. The light sensor may receive brightness data relating to the environment in which the MU 100 is disposed. Thus, the light sensor may indicate changes in brightness intensity so that the mode application 140 may interpret the data. For example, if the light sensor determines that the MU 100 goes from a high brightness environment to a low brightness environment and using proximity data, the mode application 140 may interpret the data that the MU 100 has been placed in a holster or pocket, thereby the NFC reader 135 has a low probability of being used.

It should be noted that the components of the sensor 130 described above are only exemplary. The sensor 130 may include yet further components to receive other types of data for the mode application 140 to interpret to generate a more comprehensive analysis of the data related for the NFC functionality. It should again be noted that the sensor 130 may include more than one of the examples described above. That is, the sensor 130 may include a plurality of the types described above. Thus, the sensor 130 may be a single one of the sensor types or may be a combination thereof.

According to the exemplary embodiments, the mode application 140 may receive the data from the sensor 130 to determine a mode for the NFC reader 135. As discussed above, the sensor 130 may receive a variety of different data for the mode application 140. Therefore, the mode application 140 may utilize at least one of the data from the sensor 130 to determine the mode. As discussed above, by incorporating more types of data, the mode application 140 may more accurately determine a proper mode for the NFC reader 135. The mode application 140 may change the mode for the NFC reader 135 in a variety of ways.

In a first example, the mode application 140 may determine that the NFC reader 135 should be activated. For example, the sensor 130 may indicate that the MU 100, in particular, the NFC reader 135 may be within a reading proximity (e.g., 5 cm). Thus, the mode application 140 may activate the NFC reader 135. In another example, the sensor 130 may indicate a position of the MU 100 such as in a warehouse, a delivery truck, or any location in which the NFC functionality is used. Thus, the mode application 140 may activate the NFC reader 135.

In a second example, the mode application 140 may determine that the NFC reader 135 should be deactivated. For example, the sensor 130 may indicate that the MU 100 is disposed in an area where the ambient lighting is dark around the entire MU 100. This may indicate that the MU 100 has been placed into a holster or a user's pocket. Thus, the mode application 140 may deactivate the NFC reader 135 since there is a low probability that the NFC functionality will be used. In another example, the sensor 130 may determine that there has been no movement by or near the MU 100 for a predetermined period of time. Thus, the mode application 140 may deactivate the NFC reader 135. In yet another example, the sensor 130 may determine that the device is in a constant state of motion such as in a moving car when the gyroscopic sensors and/or the accelerometers sense movements associated with car movements such as bumpiness. Thus, the mode application 140 may deactivate the NFC reader 135. In still another example, the sensor 130 may determine another environment where there is very low light, therefore being unable to see any NFC readable data locations. Accordingly, there is a low probability that the NFC reader 140 will be aimed for the NFC functionality. Thus, the mode application 140 may deactivate the NFC reader 140.

In a third example, the mode application 140 may determine that a setting of the NFC reader 135 should be changed. For example, the sensor 130 may be activated and the MU 100 may be disposed in an environment where the NFC functionality is often used. The mode application 140 may increase a signal strength of the NFC reader 140 when the device has a surface in scanning range. Thus, the mode of the NFC reader 140 may be changed to accommodate scenarios where the NFC reader 140 will most likely be used.

The mode application 140 may receive the various data of the MU 100 and/or the external parameters in which the MU 100 is disposed in a variety of ways. Specifically, the mode application 140 may receive the data from the sensor 130 at various time parameters. In a first example, the sensor 130 may continuously generate the data so that the mode application 140 may be in a continuous dynamic setting to adjust the mode. In a second example, the sensor 130 may be activated at predetermined time intervals to generate the data so that when a predetermined threshold is passed (e.g., light intensity increase/decrease, motion/position changes, etc.), the mode application 140 may change the mode of the of NFC reader 140. In a third example, the sensor 130 may generate the data when a change has occurred in one of the conditions described above. That is, when the sensor 130 determines a constant condition, no data may be generated and when the sensor 130 determines any change in a condition, the data may be generated for the mode application 140 to interpret.

Figure 2:
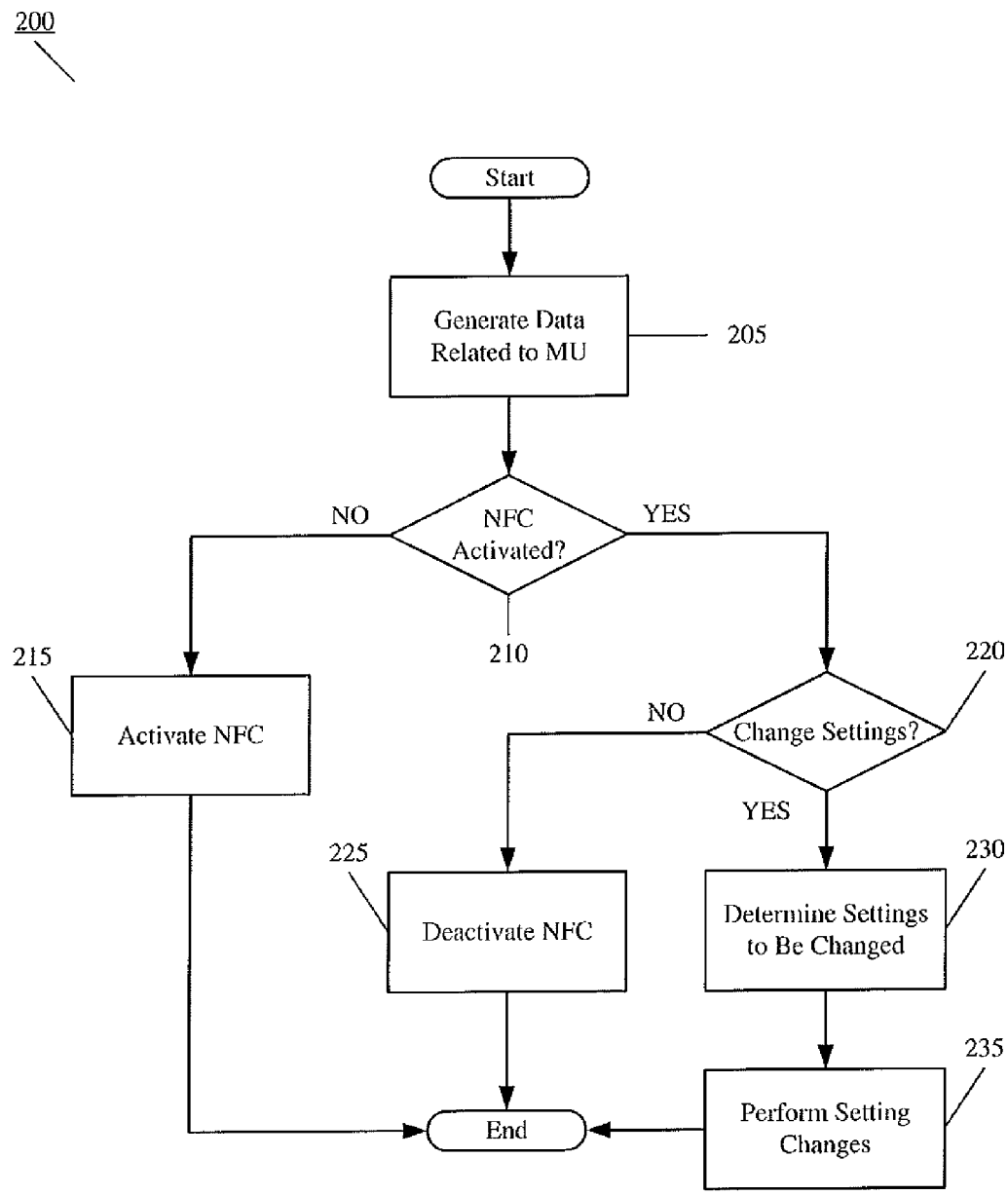
FIG. 2 shows a method for changing a mode of a mobile unit with a near field communication functionality according to an exemplary embodiment of the present invention.

FIG. 2 shows a method 200 for changing a mode of the MU 100 of FIG. 1 according to an exemplary embodiment of the present invention. The method 200 relates to the MU 100 including the NFC functionality. Those skilled in the art will understand that, as a result of using the method 200, an exemplary advantage is a reduction in a power supply consumption related to the NFC functionality. The method 200 will be described with reference to the MU 100 of FIG. 1.

In step 205, the sensor 130 generates data related to the NFC functionality for the MU 100 and/or the external conditions in which the MU 100 is disposed. As discussed above, the sensor 130 may generate the data in a continuous manner, at predetermined intervals of time, when changes in conditions are detected, etc. The sensor 130 may also generate various different types of data such as proximity data, positioning/orientation data, velocity data, light intensity data, etc. The sensor may further utilize network data from a wired and/or wireless connection.

In step 210, a determination is made whether the NFC reader 135 is activated. If the NFC reader 135 is not activated and the data from the sensor 130 indicates that the NFC reader 135 is to be activated, then the method 200 continues to step 215. As discussed above, the mode application 140 may determine that proximity data, positioning data, etc. indicates that the NFC functionality is to be used. Thus, the NFC reader 135 may be activated.

Returning to step 210, if the determination is made that the NFC reader is activated, the method 200 continues to step 220. In step 220, a determination is made whether the settings of the NFC functionality are to be changed. If the data generated in step 205 indicates that the NFC reader 135 is to be deactivated, then the NFC functionality is not required, thereby the settings require no changing. Accordingly, the method 200 continues to step 225 where the NFC reader 135 is deactivated. As discussed above, the mode application 140 may determine that light intensity data, movement data (e.g., MU 100 is stationary), velocity/orientation data (e.g., MU 100 is in a car), etc. indicates that the NFC functionality is not to be used.

Returning to step 220, if the settings are to be changed, the method 200 continues to step 230 where the settings to be changed are determined by the mode application 140. As discussed above, a setting may be to increase a signal strength of the NFC reader 135 as a function of the sensor data (e.g., proximity data). Thus, in step 235, the settings are updated to perform the NFC functionality.

The exemplary embodiments of the present invention provide a mobile unit including a NFC functionality to substantially reduce power consumption from a portable power supply by providing energy to the NFC reader only when the NFC functionality is to be used. A sensor of the mobile unit may provide data related to the mobile unit and external conditions in which the mobile unit is disposed. The sensor may generate a variety of different types of data and may generate the data at a variety of different times (e.g., continuously, at predetermined times, when a change occurs, etc.). Subsequently, a mode application may receive the data to determine how to change the mode of the NFC reader as a function thereof. Thus, the NFC reader may be activated, deactivated, or have settings changed. In this manner, the NFC reader may be used only when required, thereby increasing an amount of energy provided by the portable power supply.

Those skilled in the art will understand that the above described exemplary embodiments may be implemented in any number of manners, including, as a separate software module, as a combination of hardware and software, etc. For example, the mode application 140 of the MU 100 may be a program containing lines of code that, when compiled, may be executed on the processor 105.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A mobile system, comprising:
a Near-Field-Communication (NFC) reader configured to communicate with an electronic device within a predetermined range;
a sensor separate from the NFC reader obtaining data related to external conditions of the mobile system indicative of operation of the mobile system in an environment, the data comprising proximity data including a distance of the NFC reader to an object;
a memory arrangement storing a mode application executed by a processor and configured to determine when a mode of the NFC reader is to be changed as a function of the data between an activation mode, a deactivation mode, and a change in a setting mode, wherein the change in the setting mode includes an increase in operating signal strength of the NFC reader as a function of the proximity data received from the sensor when the NFC reader has a surface of the object in a scanning range; and
the processor configured to:
execute the mode application; and
change the mode when the external conditions change beyond a respective predetermined threshold.

2. The mobile system of claim 1, wherein the external conditions of the mobile system include an ambient brightness of visible light around the mobile system.

3. The mobile system of claim 1, wherein the sensor includes at least one of a sonar sensor, a laser distance reader, a magnetometer, a global positioning system (GPS) reader, an accelerometer, a gyroscopic sensor, and a light sensor.

4. The mobile system of claim 1, further comprising:
a transceiver communicating with a network, the network further providing at least a part of the data.

5. The mobile system of claim 1, further comprising:
a portable power supply providing energy to the NFC reader when the mode application changes the mode of the NFC reader to the activation mode.

6. The mobile system of claim 1, wherein the mode is changed to the activation mode when the electronic device is within a predetermined range.

7. The mobile system of claim 1, wherein the respective predetermined threshold is stored in the memory arrangement.

8. A method comprising:
obtaining, by a sensor, data related to external conditions of a mobile device indicative of operation of the mobile device in an environment, the mobile device comprising an NFC reader, the sensor separate from the NFC reader, the data comprising proximity data including a distance of the mobile device to an object;
determining, with a mode application, when a mode of the NFC reader is to be changed as a function of the data between an activation mode, a deactivation mode, and a change in a setting mode, wherein the change in the setting mode includes an increase in operating signal strength of the NFC reader as a function of the proximity data received from the sensor when the NFC reader has a surface of the object in a scanning range; and
changing the mode of the NFC reader when the external conditions change beyond a respective predetermined threshold.

9. The method of claim 8, wherein the external conditions of the mobile device include an ambient brightness of visible light around the mobile device.

10. The method of claim 8, wherein the sensor includes at least one of a sonar sensor, a laser distance reader, a magnetometer, a global positioning system (GPS) reader, an accelerometer, a gyroscopic sensor, and a light sensor.

11. The method of claim 8, further comprising:
communicating with a network; and
receiving at least a part of the data from the network.

12. The method of claim 8, further comprising:
providing energy from a portable power supply of the mobile device to the NFC reader when the mode application changes the mode of the NFC reader to the activation mode.

13. The method of claim 8, wherein the mode is changed to the activation mode when the electronic device is within a predetermined range.

14. A mobile device, comprising:
an NFC reader configured to communicate with an electronic device within a predetermined range;
a sensing means separate from the NFC reader for obtaining data related to external conditions of the mobile device indicative of operation of the mobile device in an environment, the data comprising proximity data including a distance of the NFC reader to an object;
a processing means for determining when a mode of the NFC reader is to be changed as a function of the data between an activation mode, a deactivation mode, and a change in a setting mode, the mode changing when the external conditions change beyond a respective predetermined threshold, wherein the change in the setting mode includes an increase in operating signal strength of the NFC reader as a function of the proximity data received from the sensing means when the NFC reader has a surface of the object in a scanning range.

* * * * *